(12) United States Patent
Asveren et al.

(10) Patent No.: US 11,595,350 B2
(45) Date of Patent: Feb. 28, 2023

(54) NETWORKING AS A SERVICE

(71) Applicant: Ribbon Communications Operating Company, Inc., Westford, MA (US)

(72) Inventors: Tolga Asveren, Bordentown, NJ (US); Vijay Amritraj, Nashua, NH (US); Souvik Dey, Groton, MA (US)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 89 days.

(21) Appl. No.: 16/870,683

(22) Filed: May 8, 2020

(65) Prior Publication Data

US 2021/0352044 A1 Nov. 11, 2021

(51) Int. Cl.
| | | |
|---|---|---|
| *H04L 61/5007* | (2022.01) | |
| *H04L 47/20* | (2022.01) | |
| *H04L 9/40* | (2022.01) | |
| *H04L 45/00* | (2022.01) | |
| *H04L 45/745* | (2022.01) | |

(52) U.S. Cl.
CPC ........ *H04L 61/5007* (2022.05); *H04L 45/72* (2013.01); *H04L 45/745* (2013.01); *H04L 47/20* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 10,212,041 B1* | 2/2019 | Rastogi | .................. H04L 43/08 |
| 10,708,082 B1* | 7/2020 | Bakiaraj | ............. H04L 41/5051 |
| 10,778,724 B1* | 9/2020 | Miriyala | ................. H04L 63/20 |
| 11,074,091 B1* | 7/2021 | Nayakbomman | ......... G06F 8/65 |
| 11,113,090 B1* | 9/2021 | Wilkinson | ............ G06F 9/5077 |
| 11,159,366 B1* | 10/2021 | Gawade | .............. H04L 41/0803 |
| 11,171,834 B1* | 11/2021 | Bockelmann | ........... H04L 45/64 |
| 11,256,759 B1* | 2/2022 | Chen | .................. G06F 16/9024 |
| 11,316,822 B1* | 4/2022 | Gawade | ............. G06F 11/2025 |
| 2010/0020806 A1* | 1/2010 | Vahdat | ................ H04L 45/7453 |
| | | | 370/395.31 |
| 2017/0052807 A1 | 2/2017 | Ericsson | |
| 2018/0109387 A1* | 4/2018 | Vyas | ......................... G06F 8/71 |
| 2018/0115514 A1 | 4/2018 | Nubeva | |
| 2018/0288129 A1* | 10/2018 | Joshi | ...................... H04L 43/08 |

(Continued)

OTHER PUBLICATIONS

International Search Report and Written Opinion dated Aug. 12, 2021 for Application No. PCT/US21/31304.

*Primary Examiner* — Bob A Phunkulh
(74) *Attorney, Agent, or Firm* — Haynes and Boone, LLP

(57) ABSTRACT

A method performed by a computing system includes receiving a first request from a first pod being executed on the computing system, responding to the first request with an Internet Protocol (IP) address and a first port range, receiving a second request from a second pod being executed on the computing system, and responding to the second request with the Internet Protocol (IP) address and a second port range that is different than the first port range. The method further includes, with a networking service implemented within the kernel, processing network traffic between external entities and the first and second pods by updating source and destination IP addresses and ports of packets of the network traffic.

20 Claims, 6 Drawing Sheets

(56) References Cited

U.S. PATENT DOCUMENTS

| | | | |
|---|---|---|---|
| 2018/0375728 A1* | 12/2018 | Gangil | H04L 41/12 |
| 2019/0034233 A1* | 1/2019 | Cobbold | G06F 11/2097 |
| 2019/0306022 A1* | 10/2019 | Shimoga Manjunatha | H04L 41/0813 |
| 2020/0019388 A1* | 1/2020 | Jaeger | G06F 9/5077 |
| 2020/0034254 A1* | 1/2020 | Natanzon | G06F 9/455 |
| 2020/0067763 A1* | 2/2020 | Vytla | H04L 49/25 |
| 2020/0073692 A1* | 3/2020 | Rao | G06F 9/45558 |
| 2020/0076685 A1* | 3/2020 | Vaidya | G06F 9/45558 |
| 2020/0099961 A1* | 3/2020 | Dice | H04N 21/64715 |
| 2020/0106807 A1* | 4/2020 | Zamir | H04L 63/1475 |
| 2020/0112487 A1* | 4/2020 | Inamdar | H04L 41/082 |
| 2020/0252335 A1* | 8/2020 | Kelam | H04L 45/74 |
| 2020/0314015 A1* | 10/2020 | Mariappan | H04L 41/0806 |
| 2021/0019194 A1* | 1/2021 | Bahl | G06N 20/00 |
| 2021/0064443 A1* | 3/2021 | Tsirkin | G06F 9/545 |
| 2021/0072966 A1* | 3/2021 | Zong | H04L 67/32 |
| 2021/0243248 A1* | 8/2021 | Pollitt | H04L 67/1002 |
| 2021/0297510 A1* | 9/2021 | Brouer | H04L 49/90 |
| 2021/0311765 A1* | 10/2021 | Subramanian | G06F 9/45558 |
| 2021/0311792 A1* | 10/2021 | Rosoff | G06F 9/45558 |
| 2021/0328858 A1* | 10/2021 | Asveren | H04L 41/0668 |
| 2022/0201073 A1* | 6/2022 | Mallikarjuna Durga Lokanath | G06F 9/45558 |

* cited by examiner

NETWORKING AS A SERVICE

BACKGROUND

Cloud computing systems involve multiple physical computing machines, each supporting virtual environments such as containers or virtual machines. One implementation of a cloud computing system is cloud native architecture. In cloud native architecture, applications are designed as multiple, different services. Each service may run in its own container. One example of a container management system is the open source container orchestration system known as Kubernetes, from Cloud Native Computing Foundation. Kubernetes refers to virtual containers as pods. Such virtual environments can scale to meet demand and provide an efficient solution for many technologies.

One of such technologies is telecommunication technology. Telecommunication functions such as transcoding and signaling can be performed by applications run in a cloud native architecture. Specifically, virtual machines and containers may be used to perform such functions and thus scale up or down to meet demand. It is desirable to implement such solutions to make efficient use of computing resources.

SUMMARY

According to one example, a method performed by a computing system includes receiving a first request from a first pod being executed on the computing system, responding to the first request with an Internet Protocol (IP) address and a first port range, receiving a second request from a second pod being executed on the computing system, and responding to the second request with the Internet Protocol (IP) address and a second port range that is different than the first port range. The method further includes, with a networking service implemented within the kernel, processing network traffic between external entities and the first and second pods by updating source and destination IP addresses and ports of packets of the network traffic.

According to one example, a method performed by a computing system includes, supporting a plurality of pods associated with a communication application, assigning each of the plurality of pods a same Internet Protocol (IP) address and a different, non-overlapping port range, and with a networking service implemented within the kernel of the computing system, processing network traffic between the pods and external entities by updating source and destination IP addresses and ports of packets of the network traffic.

According to one example, a system includes a processor and a memory comprising machine readable instructions that when executed by the processor cause the system to receive a first request from a first pod being executed on the system, respond to the first request with an Internet Protocol (IP) address and a first port range, receive a second request from a second pod being executed on the system, respond to the second request with the Internet Protocol (IP) address and a second port range that is different than the first port range, and with a networking service implemented in a kernel, process network traffic between external entities and the first and second pods by updating source and destination IP addresses and ports of packets of the network traffic.

BRIEF DESCRIPTION OF THE DRAWINGS

Aspects of the present disclosure are best understood from the following detailed description when read with the accompanying figures.

Figure 1:
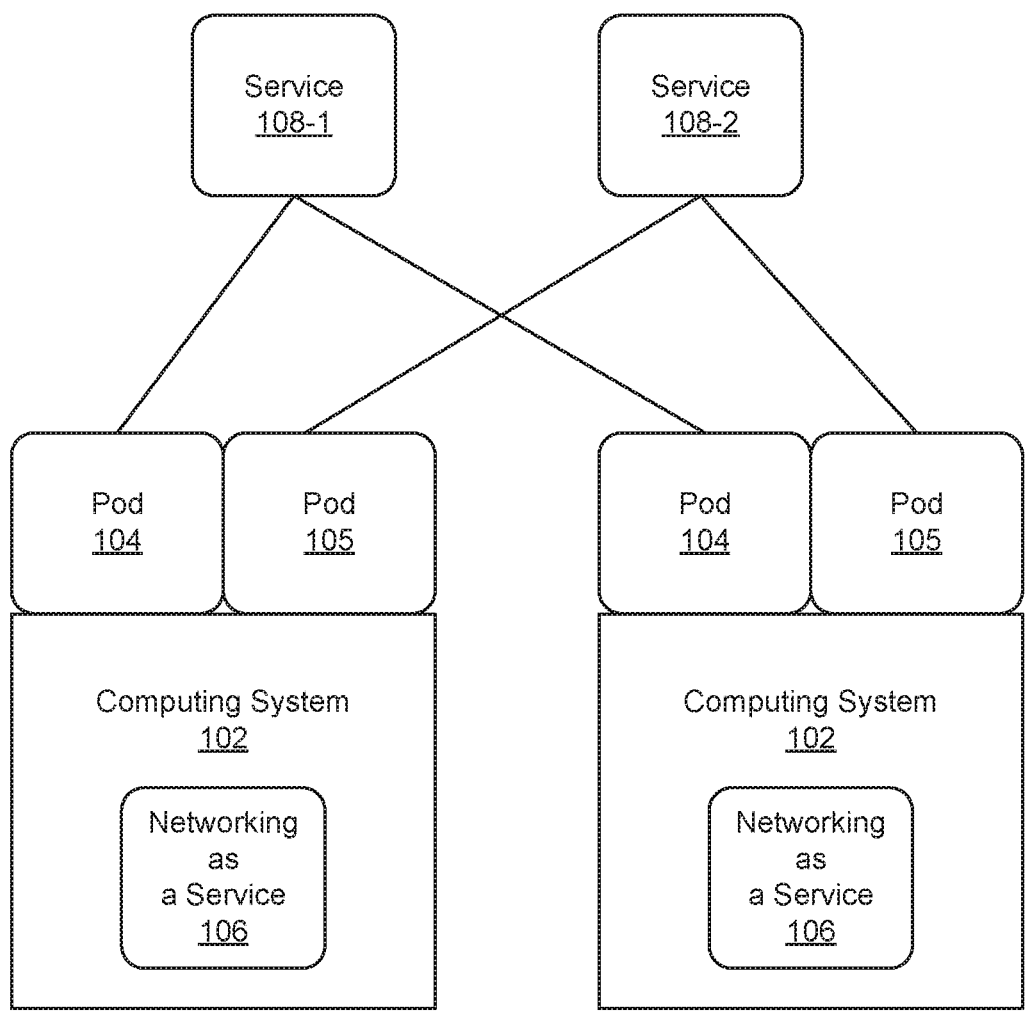
FIG. 1 is a diagram showing a networking as a service implemented within a cloud computing system, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to implement cloud infrastructure solutions for telecommunication systems in an efficient manner. Virtual environments such as containers or pods often utilize networking services to communicate with other entities. Specifically, a container or pod may be given access to the networking hardware (e.g., a Network Interface Card (NIC)) of an underlying computer system in order to transmit and receive packets to and from other entities. This process may take a lot of overhead as a particular pod takes ownership of a NIC for a period of time. During this time, other entities such as other pods or other processes are not able to use the NIC. The scheduling management of multiple pods and other processes for use on the NIC can provide additional overhead.

According to principles described herein, networking as a service can be provided by the kernel of a computing system to the pods associated with that computing system. The networking as a service may be implemented by a networking-as-a-service (NAAS) module. The NAAS module may include components both within the userspace and within the kernel. In one example, a component within the kernel (which will be referred to as a networking service) may be implemented as an extended Berkeley Packet Filter (eBPF), which is a currently existing Linux kernel capability. The NAAS may also utilize XDP and AF_XDP sockets.

The NAAS may also include a network address manager component within the userspace. The network address manager may assign the same IP address for multiple pods and assign different port ranges to different pods. For example, each pod may send an IP address request to the networking service. Each pod then receives the same IP address but a different port range. As the pods communicate with other entities, the networking service processes the packets on behalf of the pods.

The pods may then offload the processing of network packets to the portion of the NAAS module within the kernel. Specifically, the pods may process session control messages from SIP or SDP and determine how such sessions are to be handled. The pods may then instruct the NAAS module how to handle such sessions using a map data structure. The NAAS module may then perform packet processing for sessions based on the map data structure provided by the pods.

Using such techniques as described herein may provide a number of advantages. First, a pod does not have to take ownership of the NIC in order to process network traffic. This allows placing several pods on the same node to utilize the same NIC simultaneously providing efficient resource usage, greater scalability and flexibility in autoscaling.

Also, some techniques described herein may allow for greater portability by using Linux kernel capabilities. Specifically, because the networking as a service mechanism can be implemented using currently existing Linux kernel capabilities, it may be widely compatible with a variety of systems and implementations. And, dependency on specific third-party or proprietary software or plugin may be reduced or eliminated.

Furthermore, in the case where the computing system is a physical (rather than a virtual) system, it allows for bare metal packet processing at the lowest point in the software stack.

Furthermore, the proposed technique consumes fewer IP addresses than would a system that provides a different IP address to each pod. Moreover, using such techniques allows pods to be designed smaller. Specifically, instead of having a few large pods each with their own IP address, a system can have a large number of smaller pods, each sharing the same IP address and different port ranges. Smaller pods provide a smaller blast radius. In other words, if a particular pod crashes or otherwise fails, then there is less of an effect on the overall system.

FIG. 1 is a diagram showing a networking as a service implemented within a cloud computing system. According to the present example, a cloud computing architecture includes a number of computing systems 102. Those computing systems are configured to provide networking as a service 106 to the pods 104 supported by those computing systems.

As will be explained in further detail below, the computing systems include a NAAS module 106. The NAAS module 106 includes a network service (e.g., 306, FIG. 3) that performs network processing tasks on behalf of the pods. Additionally, the NAAS includes a network address manager (e.g., 206, FIG. 2) that assigns the same IP addresses and different port ranges to different pods 104. The network service then processes network traffic as instructed by the pods 104.

In a larger context, a service 108-1, 108-2 utilizes several pods 104, 105 to perform its intended function. One example of such a service is a telecommunication service such as a Session Border Controller (SBC). An SBC manages telecommunication traffic between two different networks. An SBC may perform a variety of functions such as signaling and media processing (e.g., transcoding). Other services that perform operations on network traffic are contemplated as well. For example, other services may include digit detection, fax interworking, packetization time interworking.

Each pod 104 may include one or more virtual objects such as a virtual machine or a container. In one example, the pods 104 are Kubernetes pods that each include one or more containers. The service 108-1 sends computing tasks to the pods, which then assign those tasks to the containers within such pods. Different containers may include applications to perform different aspects of the service 108. For example, in the case where the service 108-1 is an SBC, some pods may perform signaling functions while some pods perform transcoding functions.

According to principles described herein, the pods 104 may be configured to utilize the NAAS module 106 to perform functions more efficiently. Specifically, the pods 104 can offload many tasks to the kernel of the computing system so as to reduce processing overhead and make the overall system more efficient.

The computing system 102 may be a server in a datacenter. In some examples, the computing system 102 may be a plurality of servers within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing system 102 may include a number of processing resources and storage resources. The processing resources may include a plurality of processors within. The processors are designed to process machine readable instructions to perform specifically designed tasks. The processors can be designed to work together to provide parallel processing capabilities. The storage resources include various types of memory. Some types of memory, such as non-volatile types of memory, typically have large storage volume but relatively slow performance. The storage resources may include a series of hard disk drives or solid state drives that store data in the form of machine readable instructions as well as large amounts of data. The storage resources may also include volatile forms of memory, such as those used for Random Access Memory (RAM), which are optimized for speed and are often referred to as "working memory."

Figure 2:
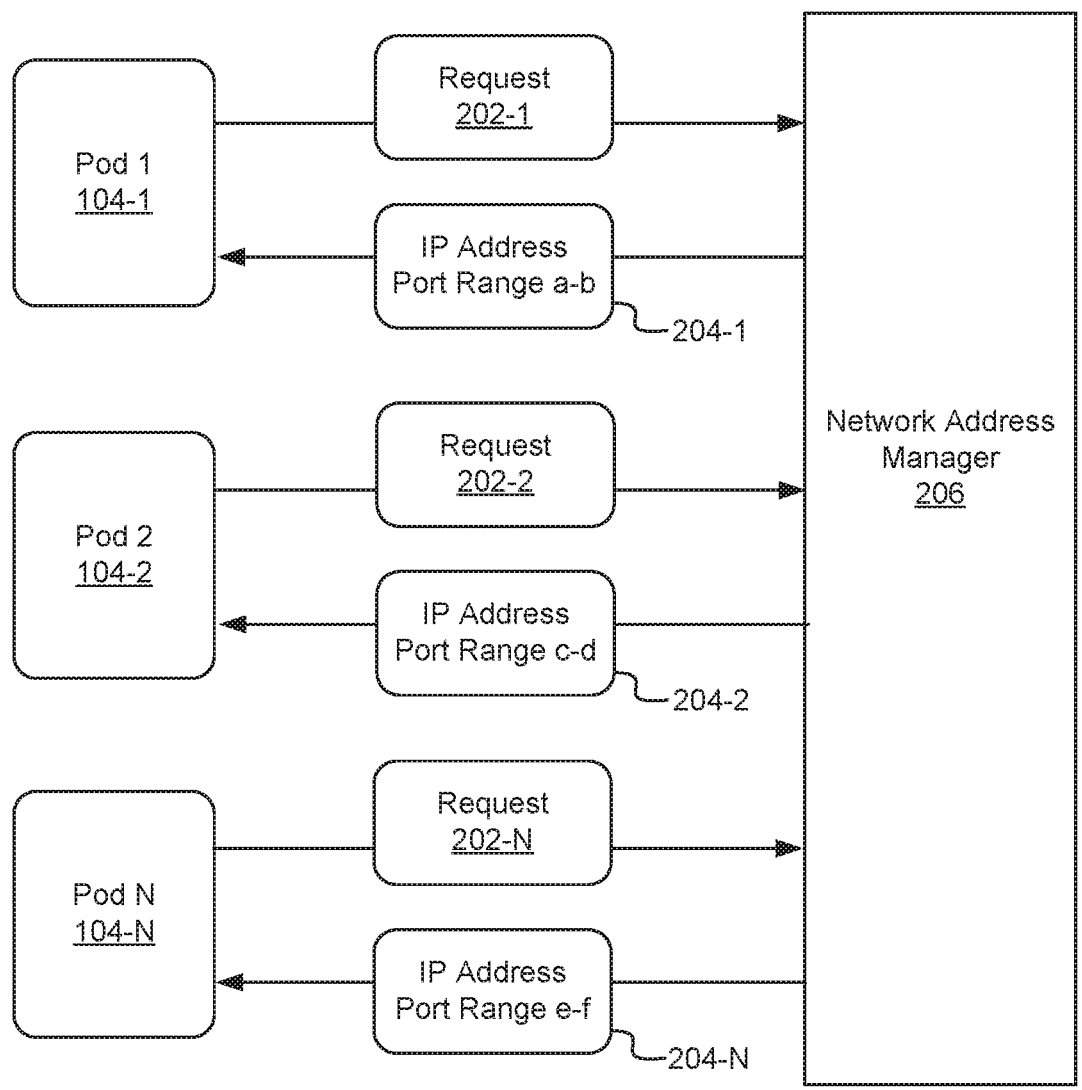
FIG. 2 is a diagram showing network address and port assignment to pods using networking as a service, according to principles described herein.

FIG. 2 is a diagram showing network address and port assignment to pods using networking as a service. According to the present example, each pod 104 on a particular computing system may request a network address from a network address manager 206 running on that computing system. The network address manager 206 may be part of the NAAS module 106. As will be explained in further detail below, the NAAS module may be implemented at least partially within the kernel.

In more detail, pod 104-1 sends a request 202-1 for a network address to the network address manager 206. The network service 206 then sends a response 204-1 that includes an Internet Protocol (IP) address and a port range. In some examples, the port range may include a single port value. In some cases, the port range may include a plurality of ports in either a continuous or non-continuous range.

Additionally, pod 104-2 sends a request 202-2 for a network address to the network address manager 206. The pod 104-2 then receives a response 204-2 from the network service. The response 204-2 includes the same IP address that was within the first response 204-1 and a different port range. In other words, the port range of response 204-2 does not overlap with the port range of response 204-1.

Similarly, pod 104-n sends a request 202-n for a network address to the network address manager 206. The pod 104-n then receives a response 204-n from the network service. The response 204-n includes the same IP address that was within the first and second responses 204-1, 204-2 and a different port range. In other words, the port range of response 204-n does not overlap with the port range of responses 204-1 and 204-2. In some examples, a health-check mechanism between the network address manager 206 and the pods 104 detects when a pod fails. In such case, the network address manager can consider the IP address/port range of the failed pod free to be used for subsequent requests.

In some examples, the IP Address and port range assigned to a pod may be static. The pod may then use one of those ports in dynamic fashion on a per session basis. Sessions are established and torn down with session establishment related signaling such as SIP/SDP. A port is reserved for a session until it is torn down. Then, it can be used for another session established by the same pod. For example, a pod that has ports 1-10 assigned may use port 3 for session A and port 5 for session B. If session B is torn down, then the pod may use port 5 for a different session.

Figure 3A:
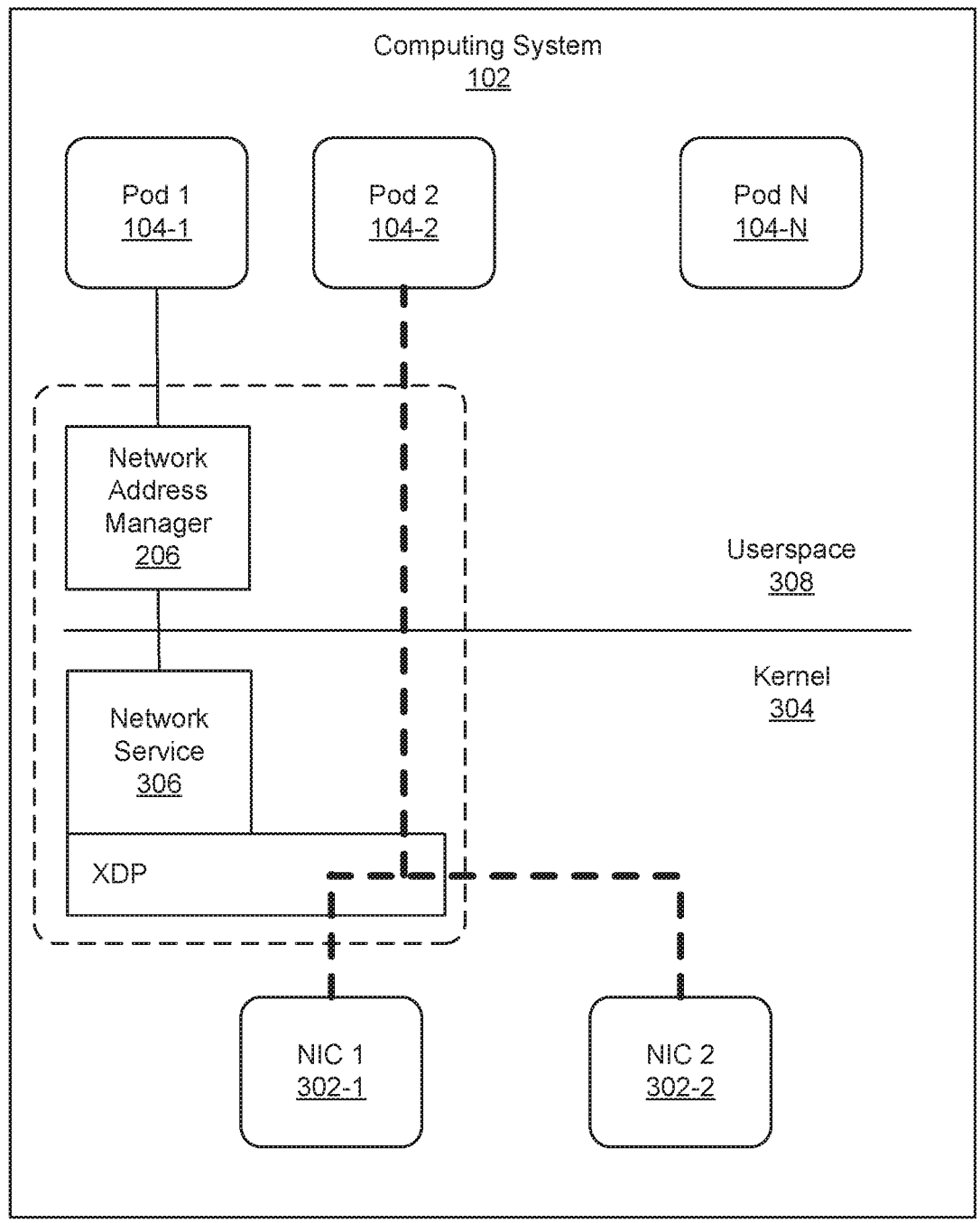
FIGS. 3A and 3B are diagrams showing implementation of a network service within the kernel of a computing system, according to one example of principles described herein.

FIG. 3 is a diagram showing implementation of a network service 306 within the kernel 304 of a computing system 102. According to the present example, the computing system 102 includes a number of NICs (which in some examples may be virtual NICs) 108-1, 108-2. The computing system 102 further includes a kernel 110. The computing system 102 also supports a plurality of pods 104-1 through 104-n.

The computing system 102 also includes networking resources which are embodied as network cards 302-1, 302-2. Network cards may also be referred to as NICs (Network Interface Cards). The network cards provide the hardware for communicating over a network with other computing entities. The network cards may be designed to communicate using Ethernet, Fiber-optic, or wireless communication technologies 302-1, 302-2.

In some examples, the network cards 302-1, 302-2 may be virtual network cards. In such case, the NICs 302-1, 302-2 are software entities that present themselves to applications as if they were a bare-metal (physical) NIC. The virtual network cards are then mapped to one or more physical NICs to perform the actual networking functions. This allows multiple virtual NICs to be associated with a single physical NIC.

The kernel 304 is a piece of software that is responsible for managing other application access to hardware resources such as the processors or memory. One example of a kernel is the Linux Kernel. The kernel 304 may include various functionalities for various purposes. One functionality of a kernel may be an extended Berkeley Packet Filter (eBPF). An eBPF provides raw access to datalink layer packets, which allows analysis to be performed on such packets. For example, the eBPF may allow an application to provide it with a filter to process packets in a specified manner.

According to the present example, the network service 306 component of the NAAS module 106 may be implemented as an eBPF within the kernel 304. In this case, the applications associated with the containers of the pods 104 can provide the networking service 306 with a data-structure that provides a mapping for processing network packets. More specifically, the applications associated with the pods or other components of the NAAS module 106 that are implemented within the userspace 308 may instruct the network service how to route traffic based on signaling information received (in the SBC example). The signaling information may be based on Session Initiation Protocol (SIP) or Session Description Protocol (SDP) or any other appropriate protocol.

For example, the pod may provide the network service 306 with remote IP/port information from one entity associated with a communication session as well as local IP/port information. The network service 306 may then translate packets as appropriate for that session. This may involve rewriting source and destination information of the packets in order to allow them to transmit on certain networks. This translation may be based on the data structure provided to the network service by the pods 104.

A given pod 104 can also instruct the network service 306 to update or remove a network session as appropriate. For example, when the pod intends to set up a new network session, it may update the data structure in the network service by adding new session information, which instructions the network service how to process packets for that session. When that session is to be terminated, the pod can instruct the network service to update the data structure so as to remove the information for processing that session. Such instructions from the pods 104 to the network service 206 may be in response to SIP messages (e.g., SIP request), SDP messages, or any appropriate message type.

In some examples, some pods 104 may be responsible for performing more complex tasks on packets. For example, pod 104-2 may be responsible for performing transcoding processes. Transcoding is used to transform data encoded with one codec into data encoded with a different codec. For such operations, a pod may use an eXpress Data Path (XDP) (e.g., AF_XDP). The XDP path provides the pod with direct memory access to data stored by the kernel to perform operations. The XDP initiative is intended to get the network stack out of the way as much as possible. While the network stack is highly flexible, XDP is built around a bare-bones packet transport that is as fast as it can be. When a decision needs to be made or a packet must be modified, XDP will provide a hook for a user supplied eBPF program to do the work. AF_XDP is intended to connect the XDP path through to the userspace. It can be thought of as being similar to the AF_PACKET address family, in that it transports packets to and from an application with a minimum of processing.

Specifically, the pod may operate directly on the data to perform transcoding processes rather than using system calls or other mechanisms that may consume additional overhead. Nevertheless, various embodiments do not exclude the possibility that system calls and other mechanisms may be used when appropriate. When operating directly on the data, the pod may instruct the network service to forward packets received on a specific IP address and port number to a particular AF-XDP socket.

Figure 3B:
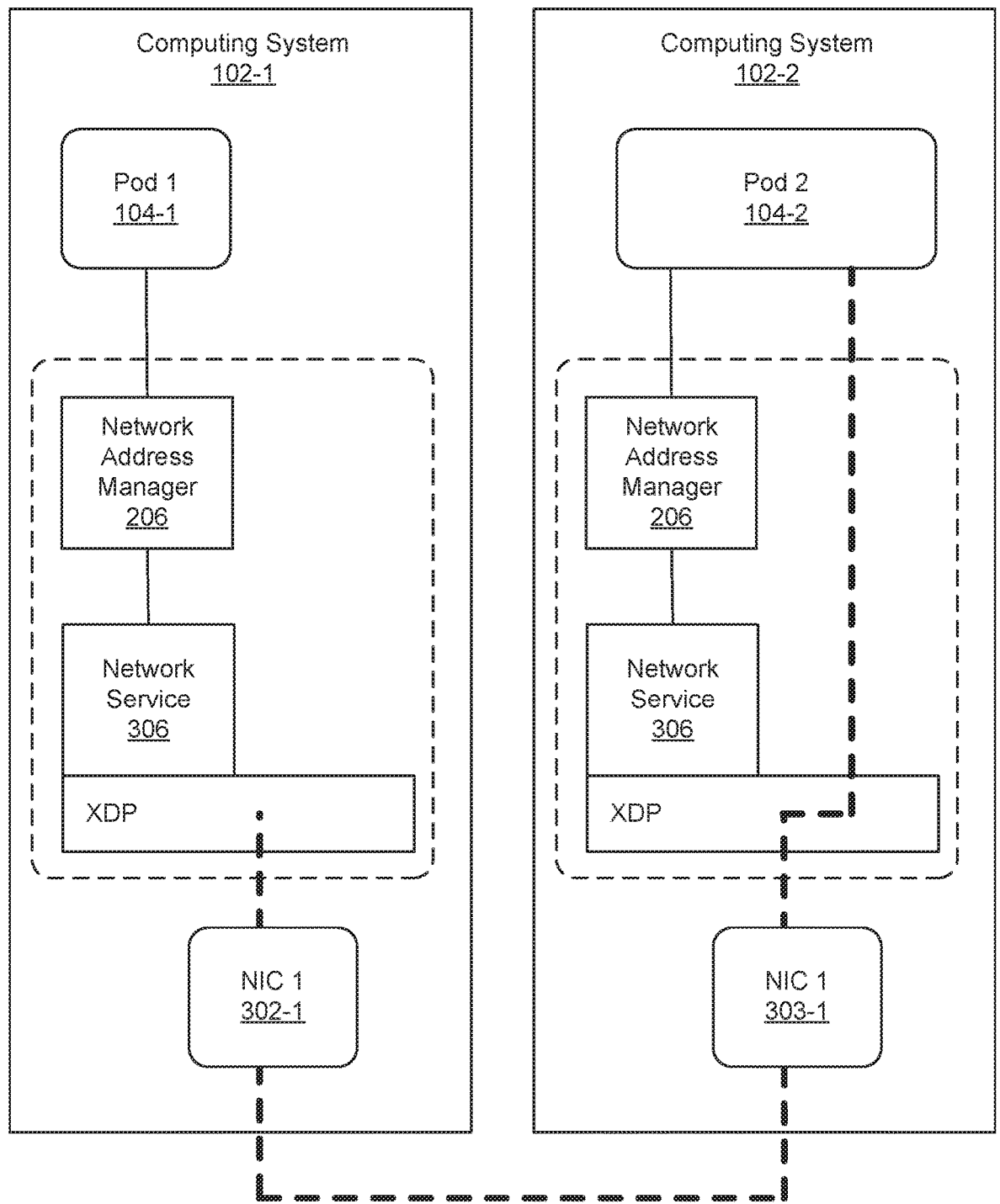

FIG. 3B illustrates an example in which a service 108-1 uses pods on two different computing systems 102. In such case, network traffic may flow between the two computing systems as shown.

Figure 4:
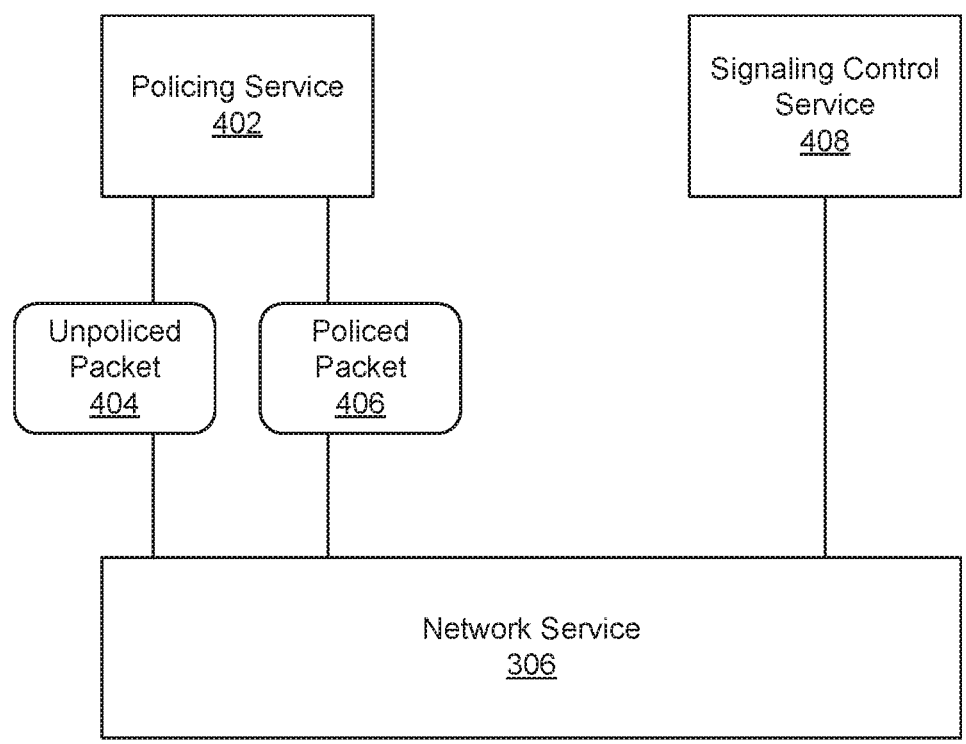
FIG. 4 is a diagram showing policing and control services for the network service, according to one example of principles described herein.

FIG. 4 is a diagram showing policing and control services for use by the networking service 306. According to the present example, the network service 306 may utilize various services that are outside the kernel (i.e., in userspace). For example, the network service 306 may utilize a policing service 402 to authenticate/authorize incoming packets.

In the present example, an incoming packet received by a NIC (e.g., 302) is handled by the network service 306. The incoming packet may be, for example, a signaling packet. The network then sends the packet (referred to as the unpoliced packet 404) to the policing service. The unpoliced packet 404 may be passed to the policing service 402 through an AF-XDP socket. In other words, the policing service is provided with direct access to the unpoliced packet. The policing service 402 may then authenticate/authorize the packet based on information from the sender. This authentication, for example, may rely on a successfully complete SIP Registration process and only packets with the same source IP/port as the one used for that message exchange would be considered authenticated. Packets from authenticated/authorized senders may be treated differently than packets from non-authenticated/authorized senders. More specifically, stricter policies may be applied to packets from non-authenticated senders than from authenticated/authorized senders.

If the packet does not meet various security criteria, it may be dropped by the policing service 402. If the packet passes through the authentication checks performed by the policing service, it is passed back to the network service 306 for further processing. This is shown as the policed packet 406 in FIG. 4. The policed packet may then be processed by the network stack of the network service 306 and then be passed to the signaling control service 408 for further processing. The signaling control service 408 may receive packets through a standard Internet socket such as a TCP/UDP socket.

Using the signaling control service 408 and the policing service 402, the network service 306 may route packets according to the service (e.g., 108-1) associated with the pods 104. For example, the applications within the pods 104 may work with the policing service 402 and signaling control service 408 to provide a map by which the network service 306 routes packets. In one example, the signaling control service and/or policing service 402 populate the map by which packets are routed.

An outgoing packet (i.e., a packet to an external entity) may follow a reverse direction. Specifically, the packet may start in the signaling control service 408, be processed through by the network stack associated with the network service 206, be processed by the policing service 402, and then provided to the NIC for transmission to its destination.

By using principles describe herein, a microservice (e.g., the NAAS module 106) oriented session control application that handles both signaling and media is realized. The networking service is able to manipulate network streams in various ways. Specifically, signaling may be handled by a signaling control service and media transcoding may be handled by a transcoding service. Such services may be outside network service 306 and thus be outside the kernel. That way, such services can include additional functionality. Other functions for manipulating packet streams are contemplated as well. Such other functions may include digit detection/interworking and fax detection/interworking. In some examples, these functions may be handled by the transcoding service. In some examples, these functions may be handled by separate services outside the network service 306 other than the policing service 402 and the signaling control service 408. Passthrough media streams may be handled in the kernel.

Through use of principles described herein, the ability to achieve high packet processing rates without involving pods having full control of a NIC is realized. The networking service provides the ability to scale pod instances on a sub-IP/port-range level. In other words, it allows for more and smaller pods. Smaller pods have a reduced blast radius in the instance of failure. In other words, systems are less affected when one pod fails. Use of techniques described herein also reduces number of IP addresses that are used up. And, the features described herein can be implemented using native Linux kernel capabilities and do not necessarily involve the use of third party software or specific hardware.

Figure 5:
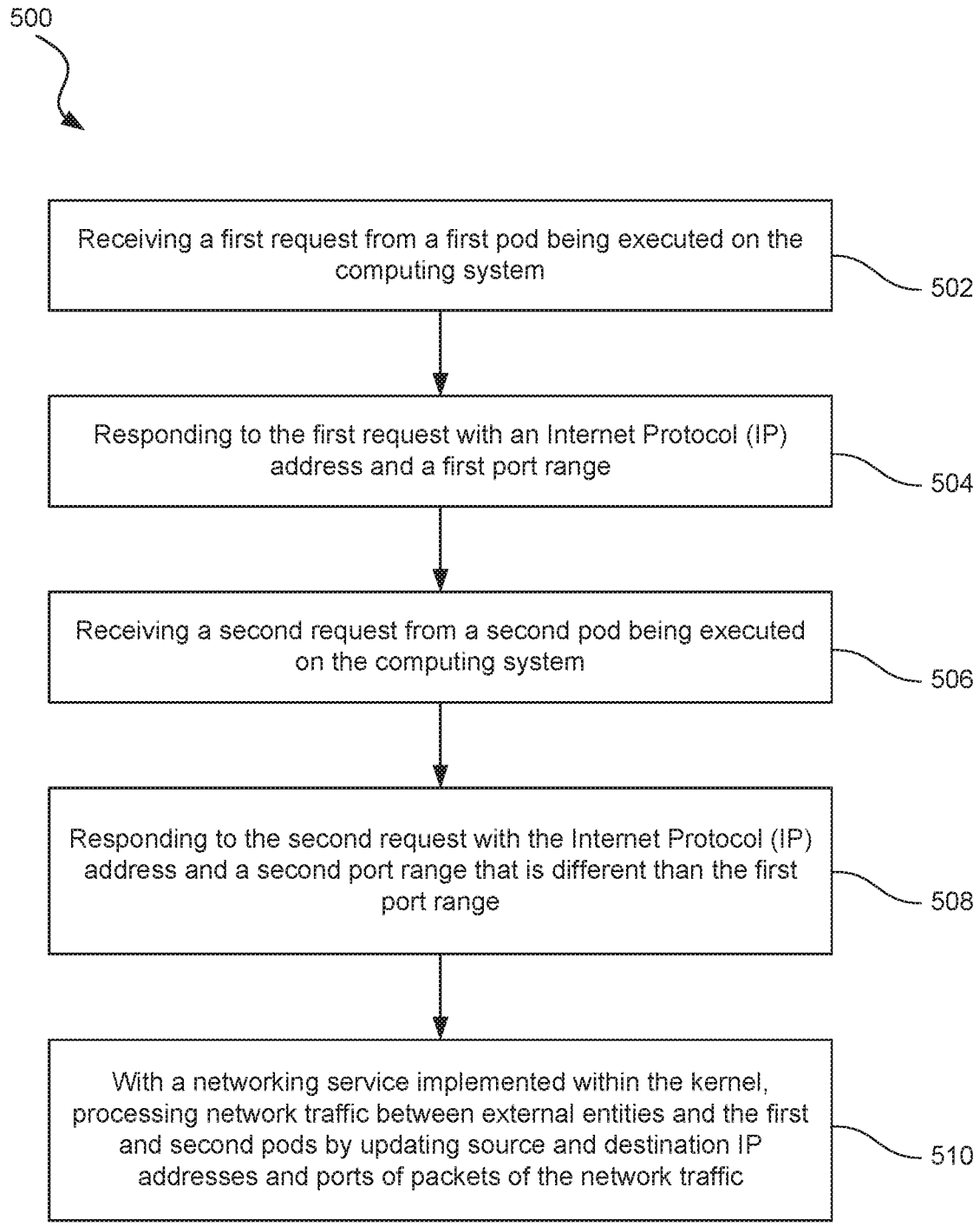
FIG. 5 is a flowchart showing an illustrative method for network as a service, according to one example of principles described herein.

FIG. 5 is a flowchart showing an illustrative method 500 for network as a service. The method may be performed by a NAAS module 106, which includes a network service (e.g., 306) that is implemented within a kernel of a computing system. The NAAS module also includes a network address manager 206 that is not implemented within the kernel. For example, a computing system 102 of FIG. 1 may read computer-executable code from a computer-readable medium and execute that code to implement the functions of the network service. According to the present example, the method 500 includes a process 502 for receiving a first request from a first pod being executed on the computing system. The pod may include one or more containers which receive tasks from a service such as an SBC. Process 502 may be performed by the network address manager.

The method 500 further includes a process 504 for responding to the first request with an Internet Protocol (IP) address and a first port range. In more detail, after the first pod sends a request for a network address to the network service, the network service then sends a response that includes an Internet Protocol (IP) address and a port range. In some examples, the port range may include a single port value. In some cases, the port range may include a plurality of ports in either a continuous or non-continuous range. Process 504 may be performed by the network address manager.

The method 500 further includes a process 506 for receiving a second request from a second pod being executed on the computing system. The method 500 further includes a process 508 for responding to the second request with the Internet Protocol (IP) address and a second port range that is different than the first port range. In other words, the second pod receives the same IP address but a different, non-overlapping port range. Process 506 may be performed by the network address manager.

The method 500 further includes a process 510 for processing network traffic between external entities and the first and second pods by updating source and destination IP addresses and ports of packets of the network traffic. Specifically, the network service may process packets on behalf of the pods according to a routing map (in the form of a data structure) provided by the pods. Various services such as policing services and signaling controlling services may be used by the pods to update the map according to the communication sessions currently being managed by the pods.

As mentioned above, processing the network traffic may be done by a network service (e.g., 306). The network service may be implemented within the kernel as an eBPF. Processing network traffic may involve replacing source and destination IP addresses and port numbers.

Processing network traffic may also involve transcoding. Because transcoding operations may be more complex than the eBPF program is designed for, the network service 306 may provide one of the pods with an AF-XDP socket. This allows the pod to operate on the data stored within the packets while they are located in kernel memory. This saves the overhead of having to move the data into memory reserved for the pod, and then move the transcoded data back into kernel memory, for processing with the packet.

Other services that are outside the network service and thus outside the kernel may also be provided with an AF-XDP socket to the kernel memory. Such services include policing services for authentication. Such services also include signaling services. The signaling services and policing services may be part of the application within containers of the pods.

In some examples, the mechanisms described (e.g., the network service 306) so far can be implemented as a CNI (Control Network Interface) plug-in rather than an eBPF in the kernel. In such case, public IP Addresses and port ranges may be specified as part of the plug-in configuration. A CNI plug-in daemon may then play the same roles as the network address manager of the network service 206. Alternatively, IP/port allocation may still be handled by the IP/Port Allocation Manager and each container can request a specific IP Address/port range from the CNI plug-in when a CNI ADD primitive is called.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
  receiving a first request from a first pod being executed on the computing system;
  responding to the first request with an Internet Protocol (IP) address and a first port range;
  receiving a second request from a second pod being executed on the computing system;
  responding to the second request with the Internet Protocol (IP) address and a second port range that is different than the first port range;
  providing, from the first pod to a networking service implemented within a kernel on the computing system, a data structure having a mapping for processing network packets, the mapping being based on signaling information for a communication session between external entities; and
  with the networking service implemented within the kernel, processing network traffic between the external entities and the first pod by updating source and destination IP addresses and ports of the network packets of the network traffic according to the mapping.

2. The method of claim 1, wherein the IP address and the first port range are assigned to the first pod for a duration of the first pod.

3. The method of claim 1, wherein the IP address and port range are assigned to the first pod for a duration of the communication session being processed by the first pod.

4. The method of claim 1, wherein the networking service is implemented as an extended Berkeley Packet Filter (eBPF).

5. The method of claim 1, wherein the first pod performs a signaling function for a communication network.

6. The method of claim 1, wherein the second pod performs a transcoding function for a communication network.

7. The method of claim 6, wherein the networking service communicates with the second pod through an eXpress Data Path (XDP) socket.

8. The method of claim 1, wherein the networking service utilizes a signaling policing service to authenticate and/or authorize the network traffic.

9. The method of claim 1, wherein the networking service uses a data structure to route the network traffic.

10. The method of claim 9, wherein the data structure is updated by the first pod.

11. A method comprising:
  with a computing system, supporting a plurality of pods associated with a communication application;
  with the computing system, assigning each of the plurality of pods a same Internet Protocol (IP) address and a different, non-overlapping port range;
  providing, from a first pod to a networking service implemented within a kernel on the computing system, a data structure having a mapping for processing network packets, the mapping being based on signaling information for a communication session between external entities; and
  with the networking service implemented within the kernel of the computing system, processing network traffic between the first pod and the external entities by updating source and destination IP addresses and ports of the network packets of the network traffic according to the mapping.

12. The method of claim 11, wherein the communication application includes a Session Border Controller (SBC).

13. The method of claim 12, wherein one of the plurality of pods performs a signaling function for the SBC.

14. The method of claim 12, wherein one of the plurality of pods performs a transcoding function for the SBC.

15. The method of claim 11, wherein the computing system is a virtual computing system.

16. The method of claim 11, wherein the updating is performed by the networking service implemented as an extended Berkeley Packet Filter (eBPF).

17. The method of claim 16, wherein the networking service uses eXpress Data Patch (XDP) sockets to connect to a subset of the plurality of pods that are for transcoding.

18. A system comprising:
  a processor; and
  a memory comprising machine readable instructions that when executed by the processor cause the system to:
    receive a first request from a first pod being executed on the system;
    respond to the first request with an Internet Protocol (IP) address and a first port range;
    receive a second request from a second pod being executed on the system;

respond to the second request with the Internet Protocol (IP) address and a second port range that is different than the first port range;

providing, from the first pod to a networking service implemented within a kernel on the system, a data structure having a mapping for processing network packets, the mapping being based on signaling information for a communication session between external entities; and with a networking service implemented in a kernel, process network traffic between external entities and the first pod by updating source and destination IP addresses and ports of the network packets of the network traffic according to the mapping.

19. The system of claim 18, wherein to process the network traffic, the system is further to use the data structure from the first pod to update the network packets and send the network packets to a network interface card (NIC).

20. The system of claim 19, wherein to process the network traffic, the system is further to use the data structure to send the network packets to an AF_XDP (eXpress Data Path) socket.

* * * * *